United States Patent [19]

Baumann et al.

[11] Patent Number: 5,666,860
[45] Date of Patent: Sep. 16, 1997

[54] GAS PEDAL ARRANGEMENT FOR A MOTOR VEHICLE

[75] Inventors: Hans-Uwe Baumann, Stuttgart; Carsten-Joerg Mertens, Aidlingen, both of Germany

[73] Assignee: Dr. Ing. h.c.F. Porsche AG, Weissach, Germany

[21] Appl. No.: 457,123

[22] Filed: Jun. 1, 1995

Related U.S. Application Data

[63] Continuation-in-part of Ser. No. 360,367, Dec. 21, 1994, Pat. No. 5,497,677.

[30] Foreign Application Priority Data

Dec. 21, 1993 [DE] Germany .............. 43 43 681.1
Oct. 21, 1994 [DE] Germany .............. 44 37 659.6

[51] Int. Cl.[6] ..................................................... G05G 1/14
[52] U.S. Cl. ........................................... 74/513; 74/560
[58] Field of Search ................... 74/501.5 R, 505, 74/506, 507, 510, 512, 513, 560, 564; 180/335

[56] References Cited

U.S. PATENT DOCUMENTS 4,182,198  1/1980  Dartnell .
4,631,033  12/1986  Menne ............................. 74/512
5,067,365  11/1991  Lauer ............................. 74/513
5,165,298  11/1992  Shier et al. ..................... 74/501.5
5,174,166  12/1992  Tryon et al. .................... 74/512
5,214,979  6/1993  Crack ............................. 74/512

FOREIGN PATENT DOCUMENTS 2017604  10/1979  United Kingdom .

*Primary Examiner*—Charles A. Marmor
*Assistant Examiner*—Mary Ann Battista
*Attorney, Agent, or Firm*—Evenson McKeown Edwards & Lenahan, PLLC

[57] ABSTRACT

A gas pedal arrangement for a motor vehicle has a pedal plate which is swivellably held on a pedal holding device in the form of a housing. This pedal plate is connected with an adjusting device. The pedal holding device consists of an oblong housing which includes two half shells and in which components of the adjusting device are held on bearing points molded on the inside. On the outside of the half shells, transversely extending catch hook strips are provided, and on an underside of the half shells directed toward the vehicle body, molded-on common centering domes are provided for the fastening and fixing of the position of the housing. A gas pull is connected with a deflecting lever in a suspended manner, the gas pull being guided in the base of the pedal plate on a swivellable deflecting pulley which has a circular-arc-shaped segment.

12 Claims, 3 Drawing Sheets

GAS PEDAL ARRANGEMENT FOR A MOTOR VEHICLE

This is a continuation-in-part application of application Ser. No. 08/360,367, filed Dec. 21, 1994, now U.S. Pat. No. 5,497,677.

BACKGROUND AND SUMMARY OF THE INVENTION

This invention relates to a gas pedal arrangement of the type disclosed in the above-identified application.

With respect to the gas pedal arrangement discussed in the above-identified patent application, a guide of an end of the gas pull on a deflecting pulley is described. A movement, which affects the gas pull corresponding to the movement of the pedal plate takes place by way of an inserted tension strut. This tension strut is, on the one side, suspended in a deflecting lever and, on the other side, in the deflecting pulley in which the end of the gas pull is also held. A pressure bar of the pedal plate is connected with the deflecting lever so that, when pressure is exercised on the pedal plate, a gas pull movement can be carried out.

It is an object of the invention to provide a gas pedal arrangement with a gas pull which can be mounted in a simple manner in the arrangement by means of an adjusting device.

According to the invention, this object is achieved by providing an arrangement wherein the gas pull is connected in a suspended manner with a deflecting lever and is guided in a base of a gas pedal plate on a swivellable deflecting pulley having a circular arc shaped segment.

The principal advantages achieved by means of the invention are that the gas pull is connected directly with the deflecting lever and a tension strut is eliminated between the deflecting lever and the deflecting pulley. As a result, a direct connection is provided between the deflecting lever and the gas pull which simplifies the assembly and reduces tolerances.

For guiding the gas pull, a deflecting pulley, which is constructed as a circular arc shaped segment and can be swivelled corresponding to the movements of the pedal plate, is disposed in the pedal base. For guiding the gas pull on the deflecting pulley, this deflecting pulley is provided on the side of its circumference with guiding devices in the form of radially projecting webs which receive the gas pull between one another.

These guiding devices are arranged in such a manner that, in the case of the inoperative position as well as in the case of the maximal operating position, the bowden cable gas pull is securely guided on the deflecting pulley on the outlet side as well as on the inlet side.

Other objects, advantages and novel features of the present invention will become apparent from the following detailed description of the invention when considered in conjunction with the accompanying drawings.

DETAILED DESCRIPTION OF THE DRAWINGS

Figure 1:
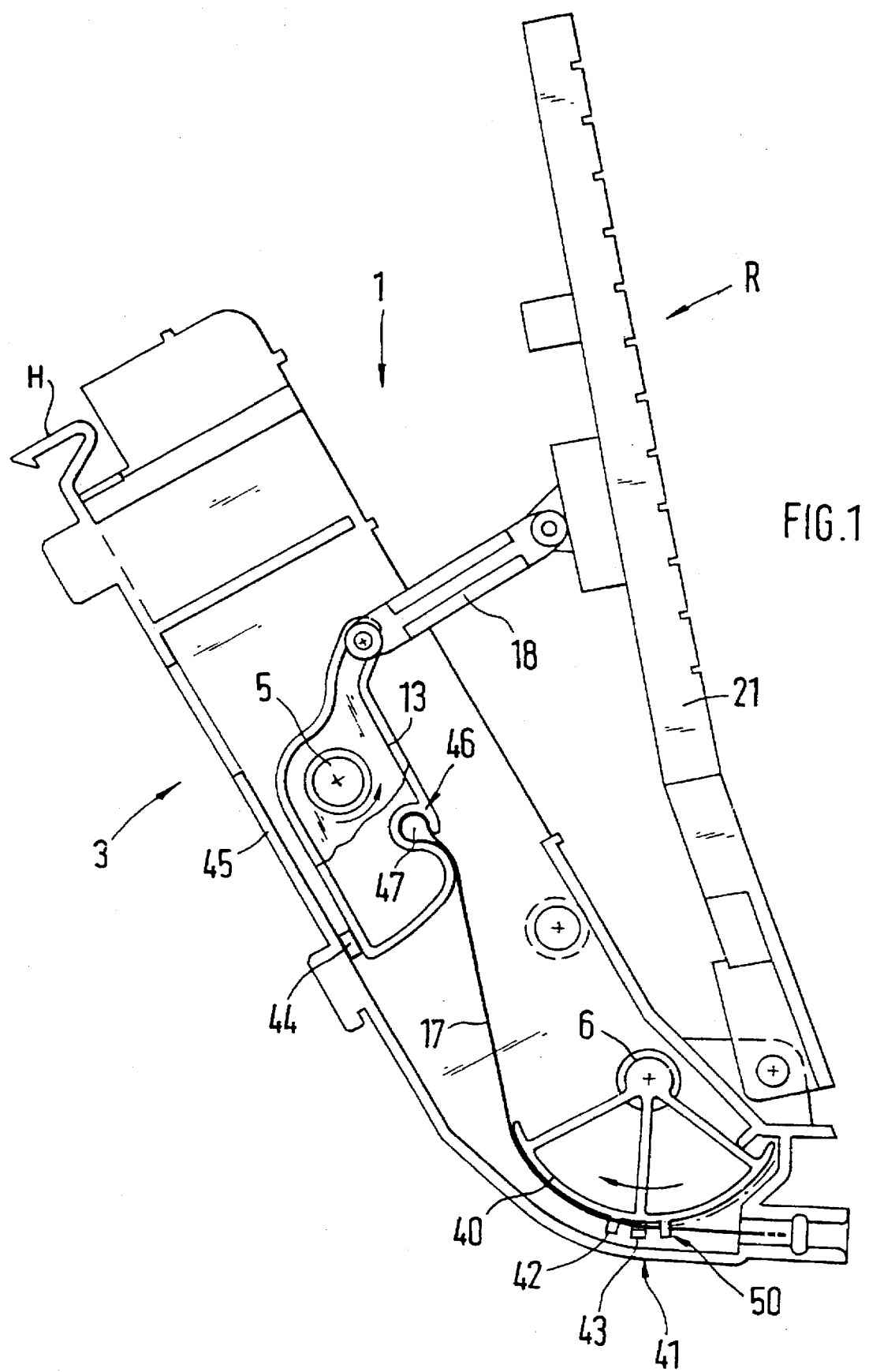
FIG. 1 is a sectional representation of a gas pedal arrangement with a pedal plate in the inoperative position, constructed according to a preferred embodiment of the present invention.
Figure 2:
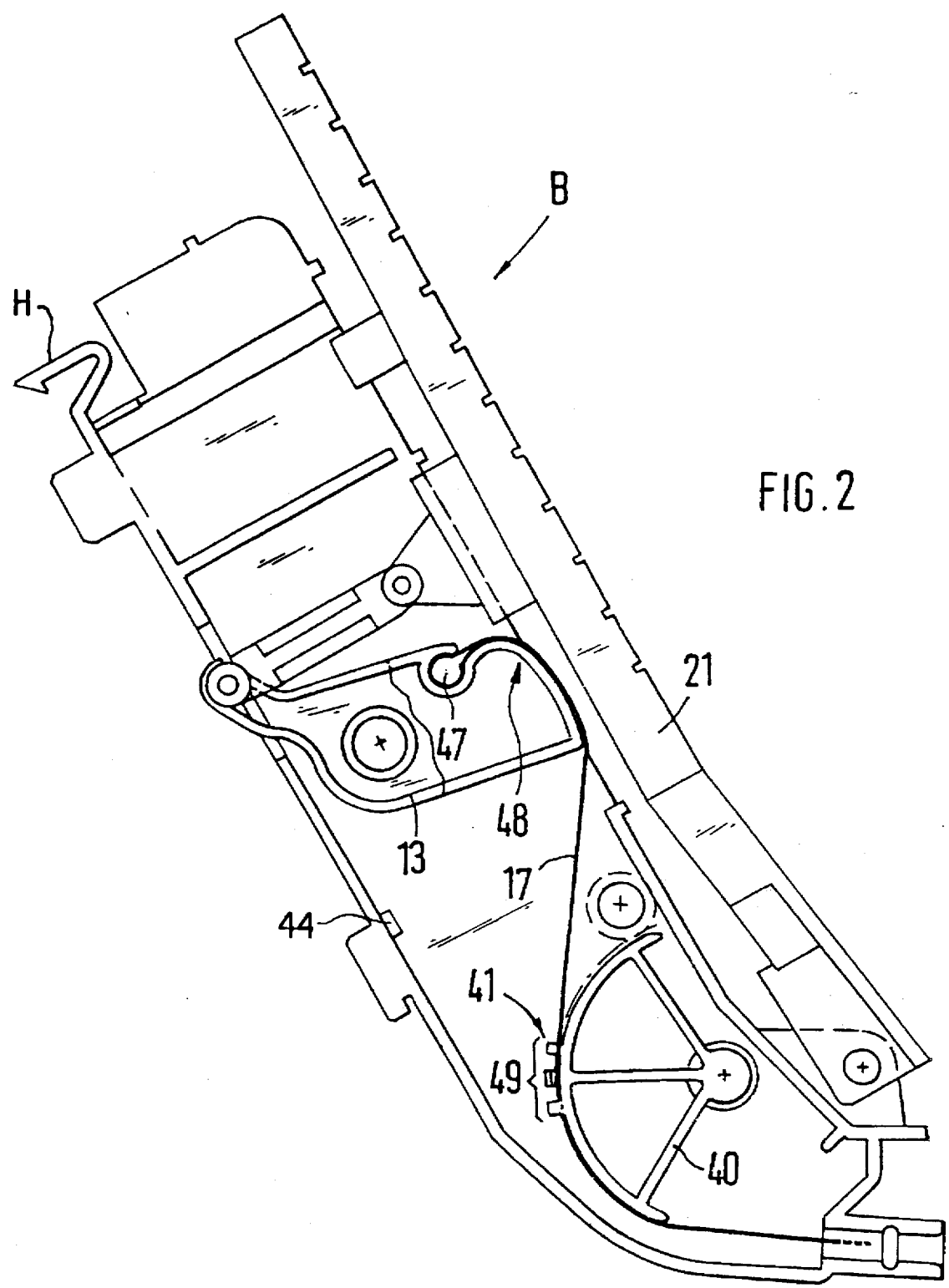
FIG. 2 is a sectional representation of the gas pedal arrangement of FIG. 1, showing the pedal plate in a maximal operating position.
Figure 3:
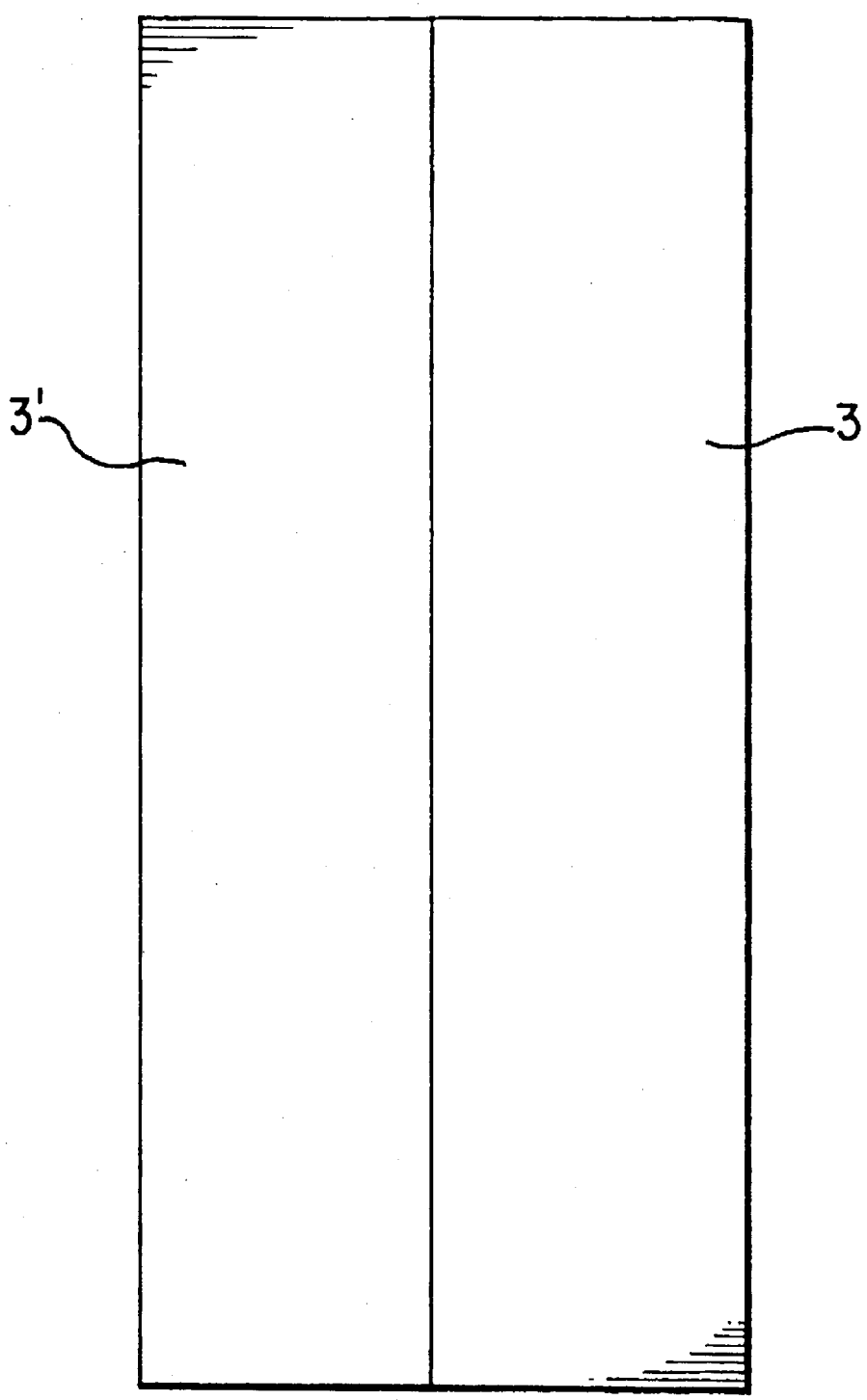
FIG. 3 is a schematic depiction of the two half shells forming the oblong housing of the gas pedal holding arrangement of FIGS. 1 and 2.

The gas pedal arrangement 1 comprises essentially a pedal holding device which is composed of two half shells—of which only one half shell 3 is illustrated in FIGS. 1 and 2—to form a closed oblong housing. FIG. 3 schematically depicts housing formed of half shells 3 and 3'.

The half shells have molded on bearings 5, 6 for receiving a deflecting lever 13 and a deflecting pulley 40 constructed as a circular arc shaped segment. For being fitted on top of one another, the half shells are provided with positioning pins on the half shell 3 which can be fitted into corresponding sleeves of the other half shell. A connecting of the two half shells takes place by means of screwing devices. Clips elements with catch hooks H are used for fixing the housing on a vehicle body wall or for a connecting with a vehicle floor.

The deflecting lever 13 is connected with a pressure bar 18 of a pedal plate 21 held on the housing and has a suspended gas (bowden cable) pull 17. This gas pull 17 is deflected by way of a deflecting pulley 40 arranged at the base of the pedal plate 21.

For the suspension of an end-side pin 47 of the gas pull 17, the deflecting lever 13 is provided with a receiving device 46. Guiding devices 41, which consist of radially projecting noses 42 and 43 which receive the gas pull 17 between one another in a holding manner, are molded to the deflecting pulley 40 on the circumference-side guide path.

As illustrated in detail in FIG. 1, in the inoperative position R of the pedal plate 21, the gas pull 17 is held on the circumference-side by way of an approximate quarter circle of the segment of the deflecting disk 40, in which case the guiding devices 41 hold the gas pull in position on the outlet side at reference number 50. By way of a stop 44 on a wall 45 of the pedal housing, the deflecting lever 13 is supported on the housing in the inoperative position R.

FIG. 2 illustrates an operating position B of the pedal plate 21 in which the gas pull 17 is again guided and held in position on the inlet side in the area 49 while the deflecting pulley 40 is rotated.

The deflecting lever 13 has a curved guiding surface 48 against which the gas pull 17 comes to rest when the pedal plate 21 is changed from the inoperative position R to the operative position B.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Gas pedal arrangement for a motor vehicle comprising:

a gas pull, a pedal plate swivellably disposed on a pedal holding device in the form of a housing, and an adjusting device connected with the pedal plate and the gas pull, wherein the pedal holding device comprises an oblong housing which is formed of two half shells having bearing points molded on for components of the adjusting device, wherein the gas pull is connected in a suspended manner with a deflecting lever of the adjusting device with the gas pull being guided in a base of the pedal plate on a swivellable deflecting pulley having a circular-arc shaped segment, wherein the gas pull is held on the deflecting pulley by guiding devices which hold an outlet side of the gas pull against the deflecting pulley when the pedal plate is in an inoperative position and which hold an inlet side of the gas pull against the deflecting pulley when the pedal plate is in an operative position, wherein the deflecting lever has a receiving device for suspending a pin fastened on an end of the gas pull, and wherein the gas pull rests on a curved guiding surface of the deflecting lever when the pedal plate is swivelled from its inoperative position into its operative position.

2. Gas pedal arrangement for a motor vehicle comprising:

a gas pull, a pedal plate swivellably disposed on a pedal holding device in the form of a housing, and an adjusting device connected with the pedal plate and the gas pull, wherein the pedal holding device comprises an oblong housing which is formed of two half shells having bearing points molded on for components of the adjusting device, wherein the gas pull is connected in a suspended manner with a deflecting lever of the adjusting device with the gas pull being guided in a base of the pedal plate on a swivellable deflecting pulley having a circular-arc shaped segment, wherein the deflecting lever has a receiving device for suspending a pin fastened on an end of the gas pull, and wherein the gas pull rests on a curved guiding surface of the deflecting lever when the pedal plate is swivelled from an inoperative position into an operative position.

3. Arrangement according to claim 2, wherein the deflecting pulley has guiding devices for the gas pull which consist of radially projecting noses which receive the gas pull between one another.

4. Arrangement according to claim 2, wherein the gas pull is held on the deflecting pulley by guiding devices protruding from the deflecting pulley.

5. Arrangement according to claim 2, wherein said gas pull is a bowden cable.

6. Arrangement according to claim 2, wherein the gas pull is held on the deflecting pulley by guiding devices which hold an outlet side of the gas pull against the deflecting pulley when the pedal plate is in its inoperative position and which hold an inlet side of the gas pull against the deflecting pulley when the pedal plate is in its operative position.

7. Arrangement according to claim 6, wherein the deflecting lever is supported in its inoperative position by way of a stop on a wall of the pedal housing.

8. Arrangement according to claim 6, wherein the guiding devices consist of radially projecting noses which receive the gas pull between one another.

9. Gas pedal arrangement for a motor vehicle comprising:

a gas pull, a pedal plate swivellably disposed on a pedal holding device in the form of a housing, and an adjusting device connected with the pedal plate and the gas pull, wherein the pedal holding device comprises an oblong housing which is formed of two half shells having bearing points molded on for components of the adjusting device, and wherein the gas pull is constructed in the form of a flexible cable having one end connected with a deflecting lever of the adjusting device and a portion guided in a base of the pedal plate on a swivellable deflecting pulley having an arc-shaped segment, wherein the deflecting lever has a receiving device for suspending a pin fastened on an end of the gas pull, and wherein the gas pull rests on a curved guiding surface of the deflecting lever when the pedal plate is swivelled from an inoperative position into an operative position.

10. Arrangement according to claim 9, wherein the deflecting pulley has guiding devices for the gas pull which consist of radially projecting noses which receive the gas pull between one another.

11. Arrangement according to claim 9, wherein the deflecting lever is supported in its inoperative position by way of a stop on a wall of the pedal housing.

12. Arrangement according to claim 9, wherein the deflecting pulley has guiding devices for the gas pull which consist of radially projecting noses which receive the gas pull between one another.

* * * * *